(12) United States Patent
Okura

(10) Patent No.: US 7,045,924 B2
(45) Date of Patent: May 16, 2006

(54) BOBBINLESS HIGH-DENSITY ARMATURE HAVING NO SUBSTRATE, AND ROTOR USING THE SAME

(75) Inventor: Noriyoshi Okura, Saitama (JP)

(73) Assignee: Okayama Giken Co., Ltd., Saitama-ken (JP)

( * ) Notice: Subject to any disclaimer, the term of this patent is extended or adjusted under 35 U.S.C. 154(b) by 0 days.

(21) Appl. No.: 10/936,567

(22) Filed: Sep. 9, 2004

(65) Prior Publication Data

US 2005/0067910 A1    Mar. 31, 2005

(51) Int. Cl.
*H02K 17/00* (2006.01)
(52) U.S. Cl. ..................... 310/208; 310/207
(58) Field of Classification Search ......... 310/201–208
See application file for complete search history.

(56) References Cited

U.S. PATENT DOCUMENTS

| 4,404,485 | A | * | 9/1983 | Ban et al. ............. 310/198 |
| 4,634,912 | A | * | 1/1987 | Heyraud ............... 310/268 |
| 4,677,332 | A | * | 6/1987 | Heyraud ............... 310/184 |
| 5,723,933 | A | * | 3/1998 | Grundl et al. ......... 310/266 |
| 6,011,339 | A | * | 1/2000 | Kawakami ............ 310/208 |
| 6,040,650 | A | * | 3/2000 | Rao ..................... 310/268 |

* cited by examiner

*Primary Examiner*—Dang Le
(74) *Attorney, Agent, or Firm*—Rader, Fishman & Grauer PLLC

(57) ABSTRACT

A miniaturized rotor is provided for improving the efficiency of an engine by using a bobbinless high-density armature without using a substrate which interferes with magnetic force.

19 Claims, 5 Drawing Sheets

BOBBINLESS HIGH-DENSITY ARMATURE HAVING NO SUBSTRATE, AND ROTOR USING THE SAME

TECHNICAL FIELD OF THE INVENTION

The present invention relates to a bobbinless high-density armature wherein linearly shaped side faces of arms of a plurality of bobbinless coils are closely brought into contact with each other, and a rotor using the same.

DESCRIPTION OF RELATED ART

In order to use bobbinless coils as electrical components, a holding box of the bobbinless coils has heretofore been required. Furthermore, in a rotor, a plurality of coils has been disposed on an insulating substrate. Moreover, on the substrate, a wiring circuit of the respective coils is printed thereon.

The engine of the rotor comprises three elements of iron yokes, magnets and an armature. The substrate is not useful for the conversion of energy, but it has been considered to be an indispensable member as a structure of the conventional armature for holding coils.

SUMMARY OF THE INVENTION

As a magnetic field distance increases, a magnetic flux of the magnets becomes weaker. The substrate interposed between the magnetic fields inhibits magnetic force as much as its thickness. In order to improve an engine efficiency of the rotor, components other than the magnets and the armature are disadvantageous, even though the substrate is considered to be essential as a structural member for constituting a conventional armature.

Further, in general, even if a coil core is angular, the outer shape of a coil becomes circular, as winding layers are piled up by regular winding, an outer diameter size also becomes uneven. Therefore, in the case of arranging the plurality of coils, clearances are usually interposed between the coils.

Since it is impossible to dispose adjacent coils closely, an electromagnetically ineffective region exists on a surface of the armature.

In the armature for the rotor, a current density in a direction of the surface is reduced naturally.

An annular magnet magnetized in a multi-polar state is used opposite to the armature, but generally, in a magnetic field of the magnet magnetized in the multi-polar state on one sheet, there occurs an intensity distribution of a magnetic flux density which minimizes the boundary between a north pole and a south pole.

If the magnetic density is uneven, the rotor unevenly rotates, so that its function becomes markedly unstable.

It is an object of the present invention to markedly improve the efficiency of an engine for a rotor and to miniaturize the engine.

The present invention is directed to a bobbinless (or air core coil) high-density armature, wherein the side faces of arms of a plurality of regularly wound bobbinless coils (regularly wound air core coils) are linearly shaped; the side faces of the arms are closely brought into contact with each other to integrate the coils; and terminals of the coils are connected with each other.

The present invention may also be directed to a bobbinless armature having no substrate, wherein there are disposed, in an inner ring of an outer frame at least the inner ring of which is ring-shaped, coils in which the side faces of arms of a plurality of regularly wound bobbinless coils are linearly shaped; the side faces of the arms may be closely brought into contact with each other to integrate the coils; and terminals of the coils are connected with each other.

The bobbinless armature may comprise $\Omega$-typed bobbinless coils wherein winding start wires of the regularly wound coils may be on the outside of the coils without crossing the surfaces of the coils.

Further, an angle of oblique sides of the bobbinless coils may be $360°/n$ (n is the number of the bobbinless coils).

Furthermore, an inner ring may be disposed at a center portion of a frame of the plurality of bobbinless coils disposed in an outer frame. The inner ring may be a bearing.

Still further, in a rotor, iron yokes may be disposed on both of upper and lower surfaces of the bobbinless armature, and a magnet may be disposed on at least one surface of each yoke opposite to the armature.

In the rotor, the magnets may comprise a plurality of bipolar segments, and north poles and south poles of the magnets may be closely brought into contact with each other.

The present invention will become more apparent from the following detailed description of the embodiments and examples of the present invention.

DETAILED DESCRIPTION OF THE INVENTION

Description of embodiments will hereafter be given below with reference to drawings.

Figure 1:
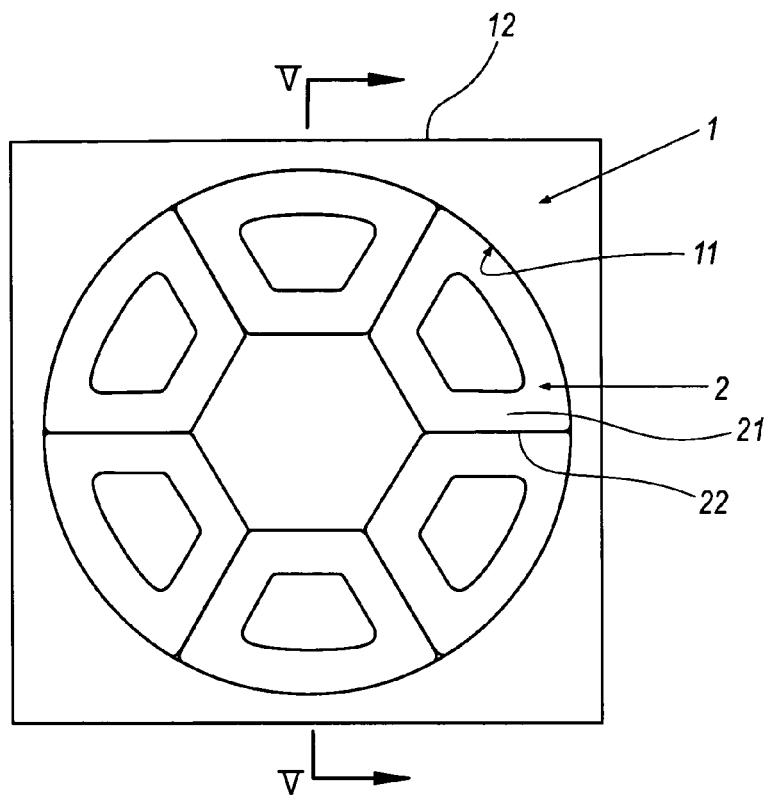
FIG. 1 is a plan view of an armature of the present invention.
Figure 2:
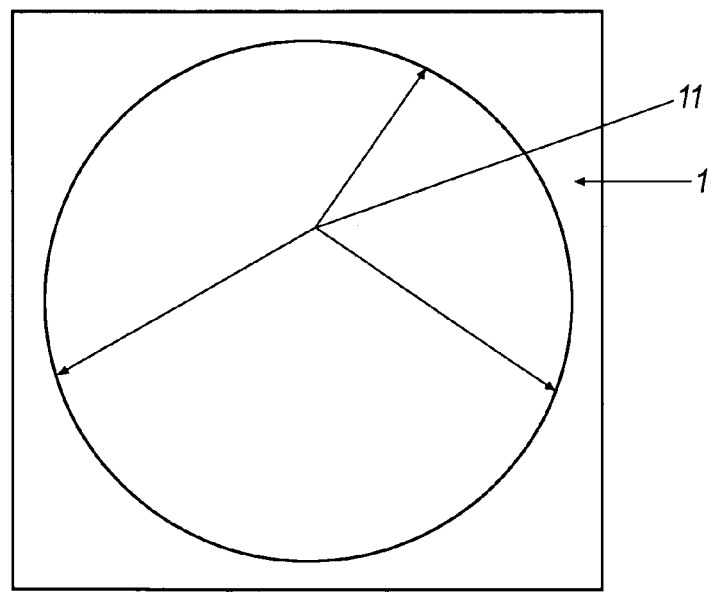
FIG. 2 shows an outer frame according to the present invention.
Figure 3:
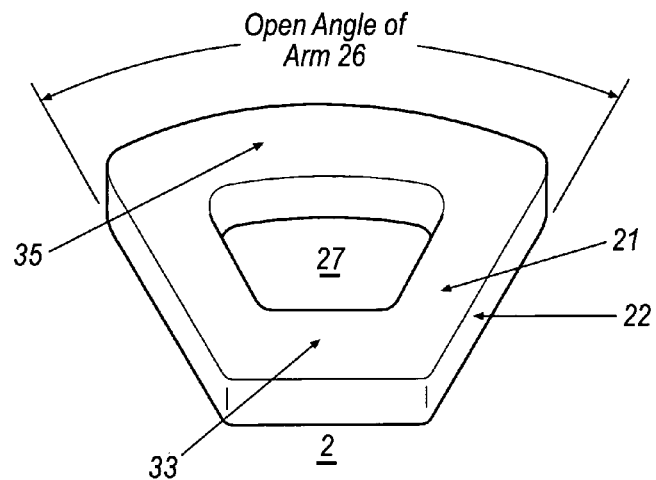
FIG. 3 shows a regularly wound coil whose arm is linearly shaped.
Figures 4A, 4B:
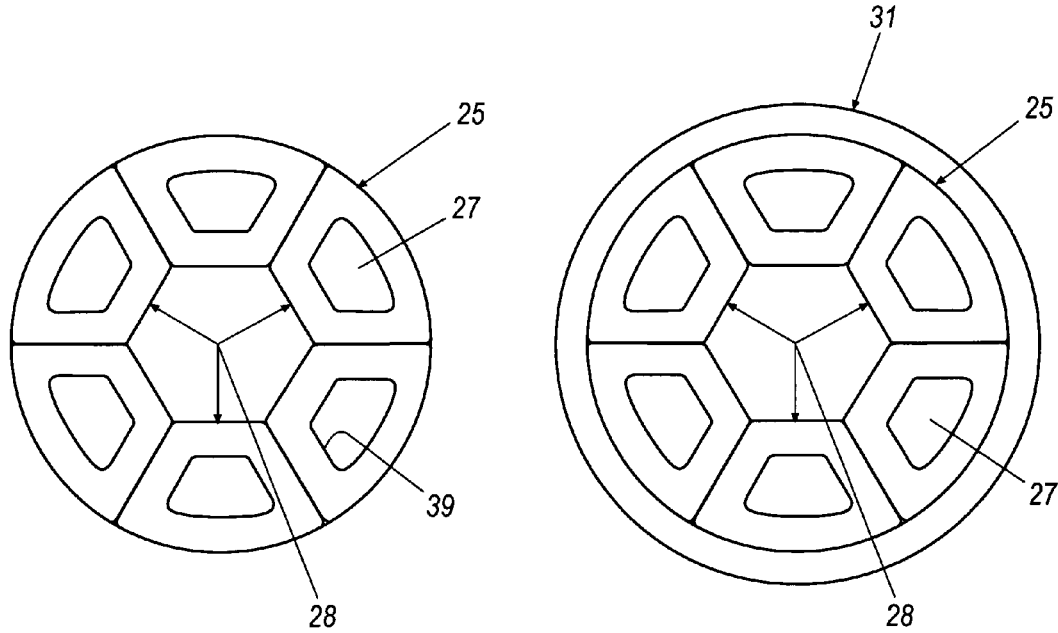
FIG. 4A and FIG. 4B show integrated coils, which are closely brought into contact with each other.

FIG. 1 is a plan view of an armature of the present invention. FIG. 2 shows an outer frame according to the present invention. FIG. 3 shows a regularly wound coil whose arms are linearly shaped. FIGS. 4A and 4B show integrated coils, which are closely brought into contact with each other.

In FIG. 1, the armature comprises the outer frame 1 shown in FIG. 2 and the coils 2 shown in FIGS. 4A and 4B. The coils 2 are disposed in a center portion 28 of the outer frame 1 inside a circular inner ring 11 thereof. The coils 2 are regularly wound, and arms 21 are worked to be linear by the outer frame 1 to be in close contact with adjacent coils 2. It is possible to dispose the inner ring 11 in an inner core portion of six coils 2. The coil 2 encircles the open area 27, whereby an inner surface 39 of the coil 2 contacts the open area 39. As shown, the side face 22 of the coil 2 is concentric with the inner surface 39. The arms 21 extend radially from the core segment 33 to contact the circumferential segment 35, and the core segment 33 contacts the arms 21. The inner surface 39, along a portion of the arms 21 between the core segment 33 and the circumferential segment 35, is in parallel along the portion with the side face 22. The side face 21 is linear along the portion and beyond a section the inner surface 39 disposed at the circumferential segment 35.

Figure 5:
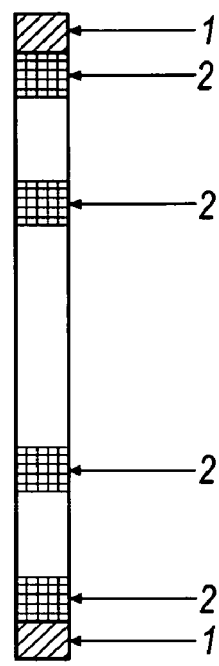
FIG. 5 is a sectional view taken along Line V—V shown in FIG. 1.

FIG. 5 is a sectional view taken along Line V—V shown in FIG. 1.

The coils 2 are disposed in the inner ring 11 of the outer frame 1.

Regularly wound bobbinless coils 2 are pressurized to connect the side faces 22 of arms 21 of the coils 2 to have a prescribed dimension and shape so as to be linear. These coils 2 are arranged in a manner that the side faces 22 of the arms 21 of adjacent coils 2 are closely brought into contact with each other to integrate the coils 2. In this embodiment, six coils 2 are provided in the inner ring 11. As shown in FIG. 4B, a joint surface of the coils 2 is bound or a hoop 31 is fitted to the outside 25 of the combined coils 2 to be fixed. As shown within FIG. 1, the bobbinless coils 2 being bound by the outer frame 1 is also within the scope of the invention. The outer ring 12 of this outer frame 1 can be circular or have another shape.

Since the fluxes of the coils 2 are set to be a structural body, a substrate for functioning as a coil supporting body is no longer required. In this regard, the substrate is dispensable.

Winding start wires of the coils 2 are drawn out to the outside 25 of the coils 2 without extending across the surfaces of the coils 2. Though a circuit board for wiring can be used if necessary, the circuit board is not required if Ω-typed coils are used wherein the winding start wires are not extended across the surface of the coils 2.

The Ω-typed coils can be produced by superposing and pasting two common coils to each other and connecting the winding start wires with each other in the bobbinless of the coils.

In FIG. 3, the open angle 26 of the arms 21 of the bobbinless coils 2 disposed in the outer frame 1 is 360°/n when the number of bobbinless coils 2 is set to be "n". Also shown within FIG. 3, the coil 2 has an open area 27, a core segment 33, an arm 21 and a circumferential segment 35.

Figure 6:
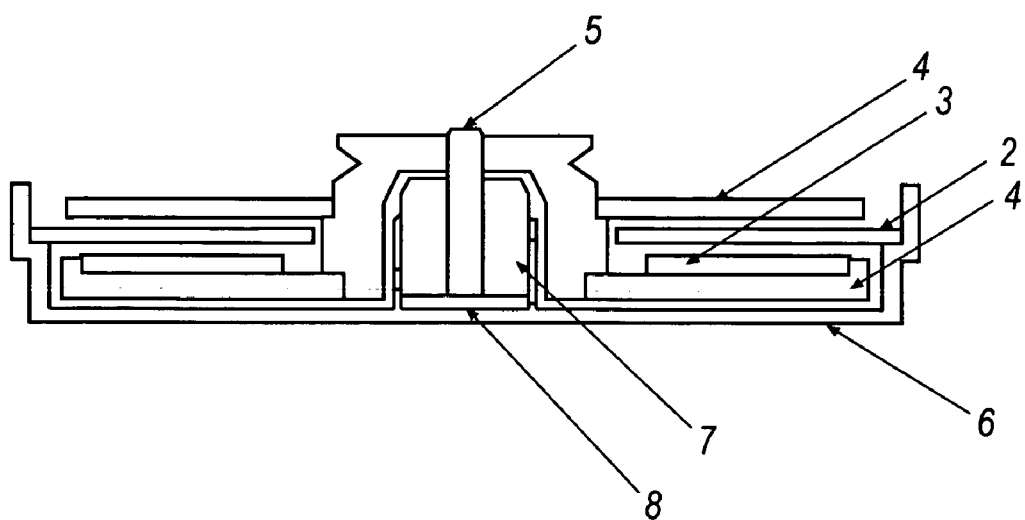
FIG. 6 is an explanatory drawing of the armature of the present invention.

In FIG. 6, a rotor of the present invention will be described. Yokes 4 are disposed in a chassis 6. A magnet 3 is provided on the yokes 4, and the coils 2 are disposed opposite to the magnets 3. A bearing 7 is disposed at the inner core portion of the yokes 4, the magnets 3 and the coils 2, and at outer/inner core portion, a thrust plate 8 is installed on the chassis 6, and a shaft 5 is disposed.

In a structure like this, an electromagnetically ineffective region does not exist between the coils 2 and furthermore, a substrate for supporting the coils 2 does not exist between the magnets 3 and the coils 2. Therefore, there is nothing to interfere with magnetic force between the coils 2 and the magnets 3, so that a distance between magnetic fields is reduced and engine efficiency of the rotor is improved.

An armature and a magnet of the present invention are used for various kinds of rotors and generate an excellent effect.

Figure 7:
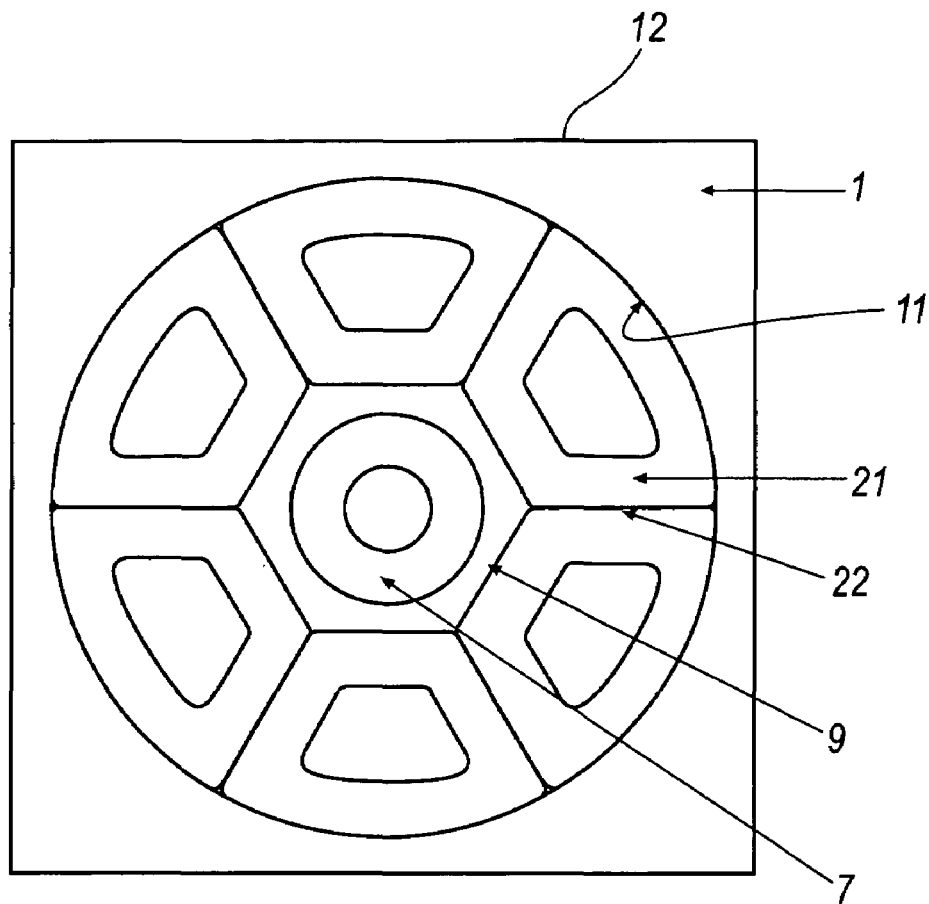
FIG. 7 shows an armature of a second embodiment of the present invention.
Figure 8:
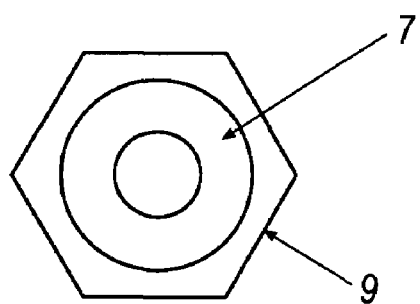
FIG. 8 shows an inside ring.

FIG. 7 shows an armature of another embodiment of the present invention. FIG. 8 shows an inner core ring 9.

As shown in FIG. 7, it is also possible to fix an inner periphery of an armature shown in FIG. 7 of the present invention with the inner core ring 9 shown in FIG. 8. It is also possible to fix an inner periphery of an armature of the present invention by disposing the inner core ring 9 which functions as an inner frame body at the center of a frame of the plurality of bobbinless coils 2 disposed in an inner core ring 9 of the outer frame. By using a function member for the inner and outer frames, other functions can be given. It is desirable to use a member having a bearing function as the inner core ring 9, for example, since it acts as a bearing.

Figure 9:
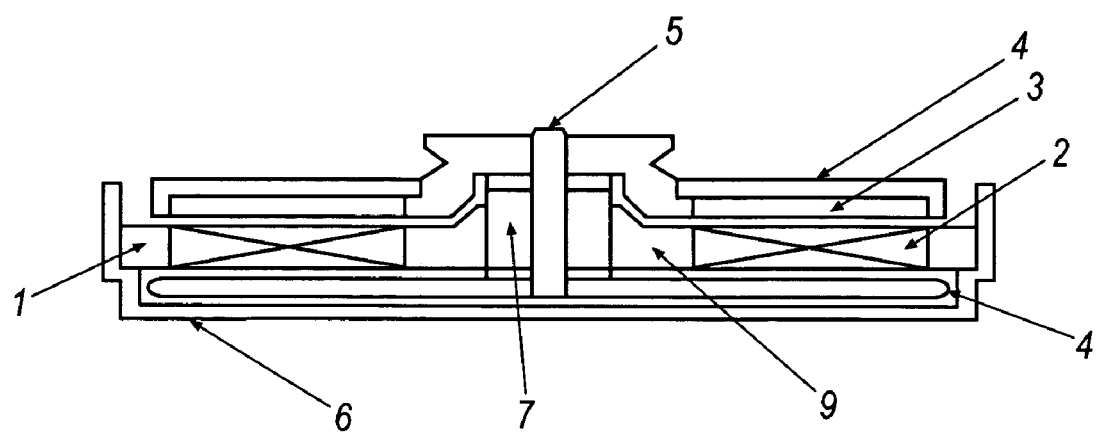
FIG. 9 shows a rotor wherein the armature according to the second embodiment is used.

FIG. 9 shows a rotor of a motor wherein the armature according to the second embodiment is used.

In FIG. 9, the armature comprising the outer frame 1, coils 2 and the inside core ring 9 provided on the outer surface of the socket 7 (bearing) is sandwiched by yokes 4 with a certain distance. On each of the yokes, magnet 3 is disposed.

The armature, magnets 3 and iron yokes 4 are necessary for a rotor, and the magnets 3 used generally are circular.

Since the armature of the present invention has a structure wherein portions at the arms 21 of the coils 2 are linearly shaped to closely bring the side faces 22 of adjacent arms into contact with each other, the fluxes themselves of the coils 2 become the structural body of the armature to dispense with the substrate for holding the coils 2. Therefore, the armature does not have an electromagnetically ineffective region in the directions of a surface and a shaft 5.

The magnets 3 are closely disposed so as to uniformly magnetize a prescribed segment and to alternately arrange north poles and south poles on the iron yokes. Since the thus constituted magnets generate magnetic fields in which a density distribution of magnetic fluxes is uniform, the conversion of magnetic energy into electric energy is evenly performed, whereby the armature smoothly functions.

When the armature of the present invention and uniformly magnetized slice magnets are used together, productivity of useful electromagnetic force in the armature is improved much. The armature having a large energy density and the feature of the magnets having uniform density of the magnetic fluxes generate a synergistic effect.

Thus the present invention possesses a number of advantages or purposes, and there is no requirement that every claim directed to that invention be limited to encompass all of them.

As stated above, within the bobbinless high-density armature of the present invention, the plurality of regularly wound bobbinless coils, whose arms for generating electromagnetic driving force among the fluxes of the coils are linearly shaped, is closely brought into contact with each other to integrate the coils. Accordingly, the fluxes of the coils are made to be a structural body and the fluxes themselves are strong enough to dispense with a substrate. Therefore, an electromagnetically ineffective region on a surface of the armature and in an axial direction is eliminated. Moreover, when the coils are held by a frame, an electromagnetic loss is eliminated and strength and operability are increased. A rotor using this armature has an excellent effect of enhancing effective electromagnetic force markedly.

The present invention is not limited to the above embodiments. For, example, in a bobbinless high-density armature, a plurality of coils are Ω-typed and winding start wires of coils are drawn out outside of the coils without crossing surfaces of the coils.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A bobbinless coil for an armature comprising:
a core segment; an arm and a circumferential segment, a substrate functioning as supporting body for said coil being dispensable, wherein:
said coil encircles an open area, an inner surface of said coil contacting said open area, a side face of said coil being concentric with said inner surface,
said arm extends radially from said core segment to contact said circumferential segment, said core segment contacting said arm,
said inner surface, along a portion of said arm between said core segment and said circumferential segment, is in parallel along said portion with said side face, and
said side face is linear along said portion and beyond a section said inner surface disposed at said circumferential segment.

2. The bobbinless coil according to claim 1, wherein:
said circumferential segment is wider than said core segment.

3. The bobbinless coil according to claim 1, wherein:
winding start wires for said coil are drawn out of said coil without crossing the surface of said coil.

4. A bobbinless high-density armature wherein:
the armature comprises a bobbinless coil according to claim 1.

5. A bobbinless high-density armature comprising:
regularly wound bobbinless coils including a first coil and a second coil, a substrate functioning as supporting body for said coils being dispensable;
said first coil having a first coil side face, a first coil arm of said first coil extending radially from a center of the armature, a portion of said first coil side face being linear along said first coil arm; and
said second coil having a second coil side face, a second coil arm of said second coil extending radially from said center of the armature, a portion of said second coil side face being linear along said second coil arm,
wherein said first coil side face is in contact with said second coil side face.

6. The bobbinless armature according to claim 5, wherein:
a first coil arm of said first coil extends radially from said central area of the armature to an elbow.

7. The bobbinless armature according to claim 5, wherein:
said first and second coil arms extend in a radial direction.

8. The bobbinless armature according to claim 5, wherein:
said portion of said first coil side face is linear along said first coil arm beyond said first coil open area.

9. The bobbinless armature according to claim 5, wherein:
terminals for each of said regularly wound bobbinless coils are connected together.

10. The bobbinless armature according to claim 5, wherein:
an angle of oblique sides of said bobbinless coils is 360°/n, "n" being the number of the bobbinless coils within the armature.

11. The bobbinless armature according to claim 5, wherein:
a hoop surrounds said bobbinless coils.

12. The bobbinless armature according to claim 5, wherein:
winding start wires for said regularly wound bobbinless coils are drawn out of said coils without crossing surfaces of said coils.

13. The bobbinless armature according to claim 5, further comprising:
an outer frame, said regularly wound bobbinless coils being disposed in a center portion of said outer frame.

14. The bobbinless armature according to claim 5, wherein:
an inside core ring is disposed at said center.

15. The bobbinless armature according to claim 14, wherein:
said inside core ring is a bearing.

16. The bobbinless armature according to claim 5, wherein:
said first coil has a first coil core segment and a circumferential segment,
said first coil encircles an open area, an inner surface of said first coil contacting said open area, said first coil side face coil being concentric with said inner surface,
said first coil arm extends radially from said core segment to contact said circumferential segment, said core segment contacting said first coil arm,
said inner surface, along a portion of said first coil arm between said core segment and said circumferential segment, is in parallel along said portion with first coil side face, and
said first coil side face is linear along said portion and beyond a section said inner surface disposed at said circumferential segment.

17. The bobbinless armature according to claim 16, wherein:
said circumferential segment is wider than said core segment.

18. A rotor comprising:
a yoke; a magnet; and an armature; wherein:
said magnet is between said yoke and said armature,
said armature is a bobbinless high-density armature according to claim 5.

19. The rotor according to claim 18, further comprising:
said armature is between said magnet and another yoke.

* * * * *